US011199816B2

(12) United States Patent
Sano et al.

(10) Patent No.: US 11,199,816 B2
(45) Date of Patent: Dec. 14, 2021

(54) ELECTRONIC TIMEPIECE AND METHOD OF ASSEMBLING ELECTRONIC TIMEPIECE

(71) Applicant: CASIO COMPUTER CO., LTD., Tokyo (JP)

(72) Inventors: Takashi Sano, Fussa (JP); Daisuke Uematsu, Akishima (JP); Yohei Kawaguchi, Akishima (JP); Tatsumi Ichimura, Ome (JP); Takumi Yasuda, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 480 days.

(21) Appl. No.: 16/181,947

(22) Filed: Nov. 6, 2018

(65) Prior Publication Data
US 2019/0137950 A1  May 9, 2019

(30) Foreign Application Priority Data

Nov. 7, 2017  (JP) ............................. JP2017-215006

(51) Int. Cl.
*G04R 60/08* (2013.01)
*G04G 17/06* (2006.01)
*G04G 21/04* (2013.01)

(52) U.S. Cl.
CPC ............. *G04R 60/08* (2013.01); *G04G 17/06* (2013.01); *G04G 21/04* (2013.01)

(58) Field of Classification Search
CPC ........ G04R 60/08; G04R 60/06; G04G 17/06; G04G 21/04; G04B 37/052; G04B 37/057

(Continued)

(56) References Cited

U.S. PATENT DOCUMENTS 8,328,416 B2 * 12/2012 Behling ............... G04B 37/052
368/287
8,454,226 B2 * 6/2013 Oostwegel ........... G04B 37/052
368/276

(Continued)

FOREIGN PATENT DOCUMENTS

CN  106662844 A   5/2017
JP  2001-235561 A  8/2001

(Continued)

OTHER PUBLICATIONS

Notice of Reasons for Refusal dated Nov. 4, 2020 received in Japanese Patent Application No. JP 2017-215006 together with an English language translation.

(Continued)

*Primary Examiner* — Edwin A. Leon
(74) *Attorney, Agent, or Firm* — Scully Scott Murphy & Presser

(57) ABSTRACT

An electronic timepiece includes an exterior case, one or more circuits housed in the exterior case, wherein the one or more circuits are configured to process a signal in a radio wave having a predetermined frequency, and a bezel disposed on an outer side of the exterior case, wherein the bezel comprises a metal portion configured to resonate with the radio wave, and wherein the metal portion of the bezel is electrically connected to the one or more circuits to transmit the signal in the radio wave received by the metal portion of the bezel to the one or more circuits. A method for assembling the electronic timepiece is further provided.

12 Claims, 6 Drawing Sheets

(58) Field of Classification Search
USPC .......................................................... 368/10
See application file for complete search history.

(56) References Cited

U.S. PATENT DOCUMENTS

| | | | | |
|---|---|---|---|---|
| 8,500,325 B2 * | 8/2013 | Ueno | ................... | G04B 37/052 |
| | | | | 368/287 |
| 8,608,372 B2 * | 12/2013 | Koshoji | ............... | G04B 37/106 |
| | | | | 368/308 |
| 2016/0064804 A1 | 3/2016 | Kim et al. | | |

FOREIGN PATENT DOCUMENTS

| | | |
|---|---|---|
| JP | 2009-168656 A | 7/2009 |
| JP | 2014-163666 A | 9/2014 |

OTHER PUBLICATIONS

Second Office Action dated Feb. 25, 2021 received in Chinese Patent Application No. CN 201811312463.6 together with an English language translation.

Decision of Refusal dated Oct. 26, 2021 received in Japanese Patent Application No. JP 2017-215006 together with an English language translation.

* cited by examiner

ELECTRONIC TIMEPIECE AND METHOD OF ASSEMBLING ELECTRONIC TIMEPIECE

CROSS-REFERENCE TO RELATED APPLICATIONS

This application is based upon and claims the benefit of priority from the prior Japanese Patent Application No. 2017-215006, filed on Nov. 7, 2017, the entire contents of which are incorporated herein by reference.

BACKGROUND

1. Technical Field

The technical field relates to an electronic timepiece, an electronic timepiece having a radio wave reception function in particular.

2. Description of the Related Art

As disclosed, for example, in JP 2014-163666 A, there is known an electronic timepiece, such as a watch, which receives satellite radio waves to acquire accurate time information, position information and so forth.

In the electronic timepiece described in JP 2014-163666 A, a ring-shaped antenna is arranged around a dial housed in an exterior case.

Because the antenna described in JP 2014-163666 A is arranged around the dial housed in the exterior case, material of the exterior case may affect antenna gain characteristics.

The antenna is not intended to appear externally, and is covered with a ring-shaped member not to be exposed.

Hence, the antenna gain characteristics also depend on material of the component (i.e. the ring-shaped member) which covers the antenna. In JP 2014-163666 A, in order to, for example, prevent the antenna gain characteristics from decreasing, as the component which covers the antenna, the ring-shaped member formed of ceramic, such as zirconia or alumina, is used.

That is, the materials for forming the exterior case and the ring-shaped member which covers the antenna are limited, and consequently a problem arises that degree of freedom in designing, design (pattern) choice and so forth is low.

Further, because the component which covers the antenna is required, the number of components may be large, and/or the electronic timepiece as a whole may be thick and/or large.

SUMMARY

Embodiments of the present invention include an electronic timepiece and a method of assembling an electronic timepiece are provided.

According to one embodiment, an electronic timepiece includes an exterior case; one or more circuits housed in the exterior case, wherein the one or more circuits are configured to process a signal in a radio wave having a predetermined frequency; and a bezel disposed on an outer side of the exterior case, wherein the bezel comprises a metal portion configured to resonate with the radio wave, and wherein the metal portion of the bezel is electrically connected to the one or more circuits to transmit the signal in the radio wave received by the metal portion of the bezel to the one or more circuits.

According to another embodiment, a method of assembling an electronic timepiece includes: providing an exterior case; providing one or more circuits configured to process a signal in a radio wave having a predetermined frequency, to be housed in the exterior case; providing a bezel comprising a metal portion configured to resonate with the radio wave, to be disposed on an outer side of the exterior case; and electrically connecting the metal portion of the bezel to the one or more circuits to transmit the signal in the radio wave received by the metal portion of the bezel to the one or more circuits.

BRIEF DESCRIPTION OF THE DRAWINGS

The accompanying drawings, which are incorporated in and constitute a part of the specification, illustrate embodiments of the present invention, and together with the general description given above and the detailed description of the embodiments given below, serve to explain the principles of the present invention, wherein.

DETAILED DESCRIPTION

Hereinafter, an embodiment of an electronic timepiece is described in detail with reference to the drawings.

In the embodiment, a watch having a bezel as an exterior member, wherein the bezel has an antenna function, is described as an example of electronic timepiece.

However, the scope of the present invention is not limited to the embodiment described or illustrated examples.

Figure 1:
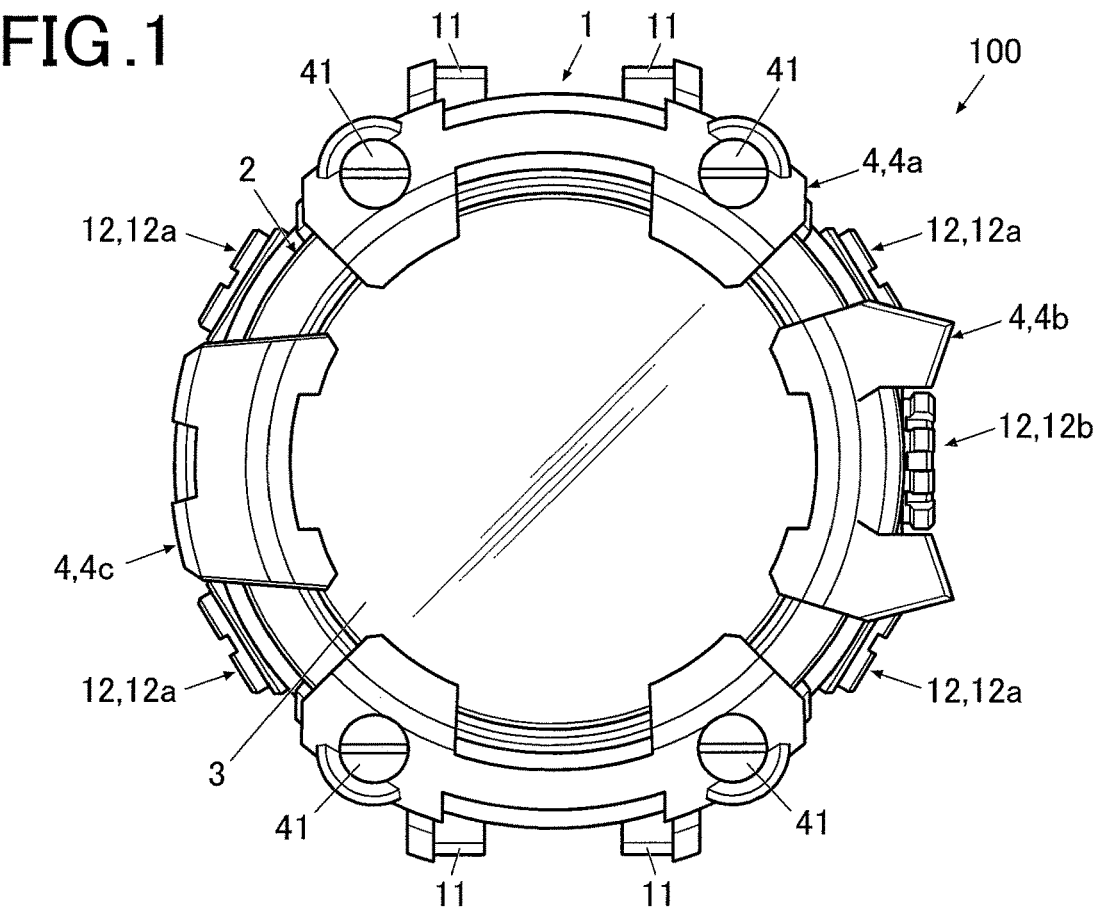
FIG. 1 is a front view of an electronic timepiece according to an embodiment of the present invention.

FIG. 1 is a front view of an electronic timepiece 100 according to an embodiment of the present invention.

As shown in FIG. 1, the electronic timepiece 100 includes an exterior case 1.

The exterior case 1 can be formed of hard resin, such as an acrylonitrile butadiene styrene (ABS) resin.

The material for forming the exterior case 1 is not limited to a resin. Usable examples thereof include: metal including stainless steel and titanium; ceramic; and other various materials.

As described in more detail below, on the upper side of the exterior case 1, a bezel 2 which functions as an antenna is mounted.

Hence, if the exterior case 1 is formed of a conductive material, such as a metal material, it is preferable that an insulating low-loss resin or the like which has a certain level of relative permittivity and does not greatly change frequency characteristics of the bezel 2 as an antenna be interposed between the exterior case 1 and the bezel 2 in order to insulate the exterior case 1 and the bezel 2 from one another.

Even if the exterior case 1 is formed of a resin material, a reinforcing material may be mixed with the resin material so that the exterior case 1 can have strength.

In this case, it is preferable that a nonconductive material, such as glass fiber, be used as the reinforcing material.

Figure 2:
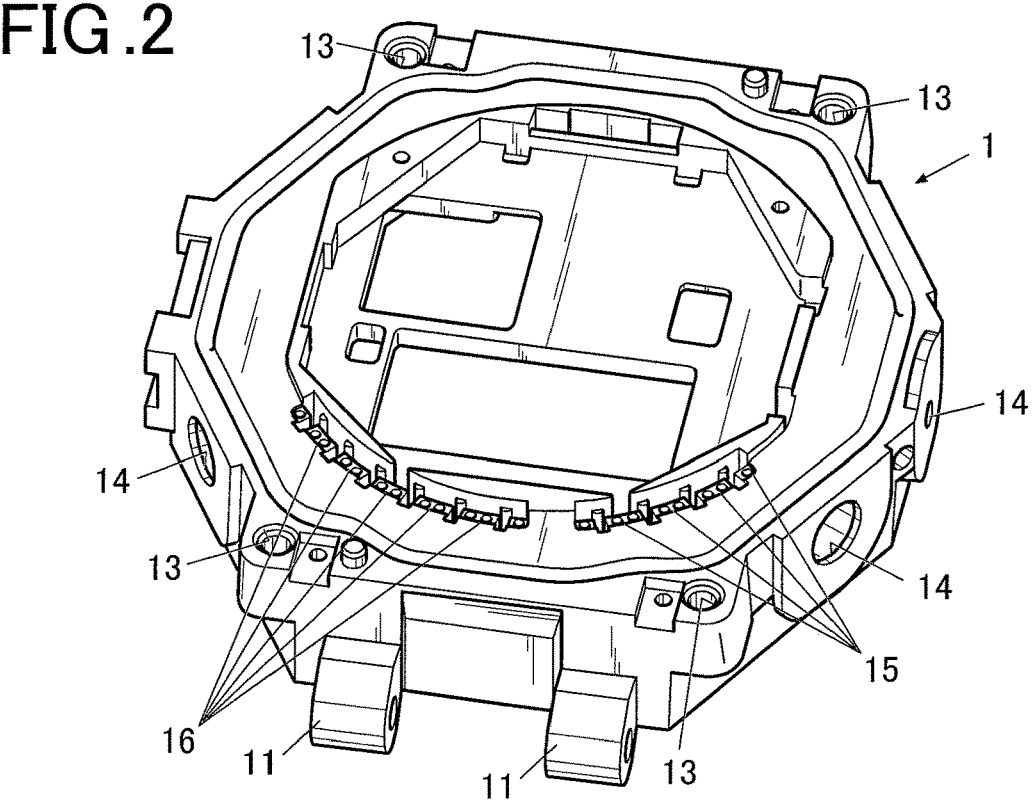
FIG. 2 is a perspective view of an exterior case of the electronic timepiece viewed from a visible side.

FIG. 2 is a perspective view of the exterior case 1.

Figure 3:
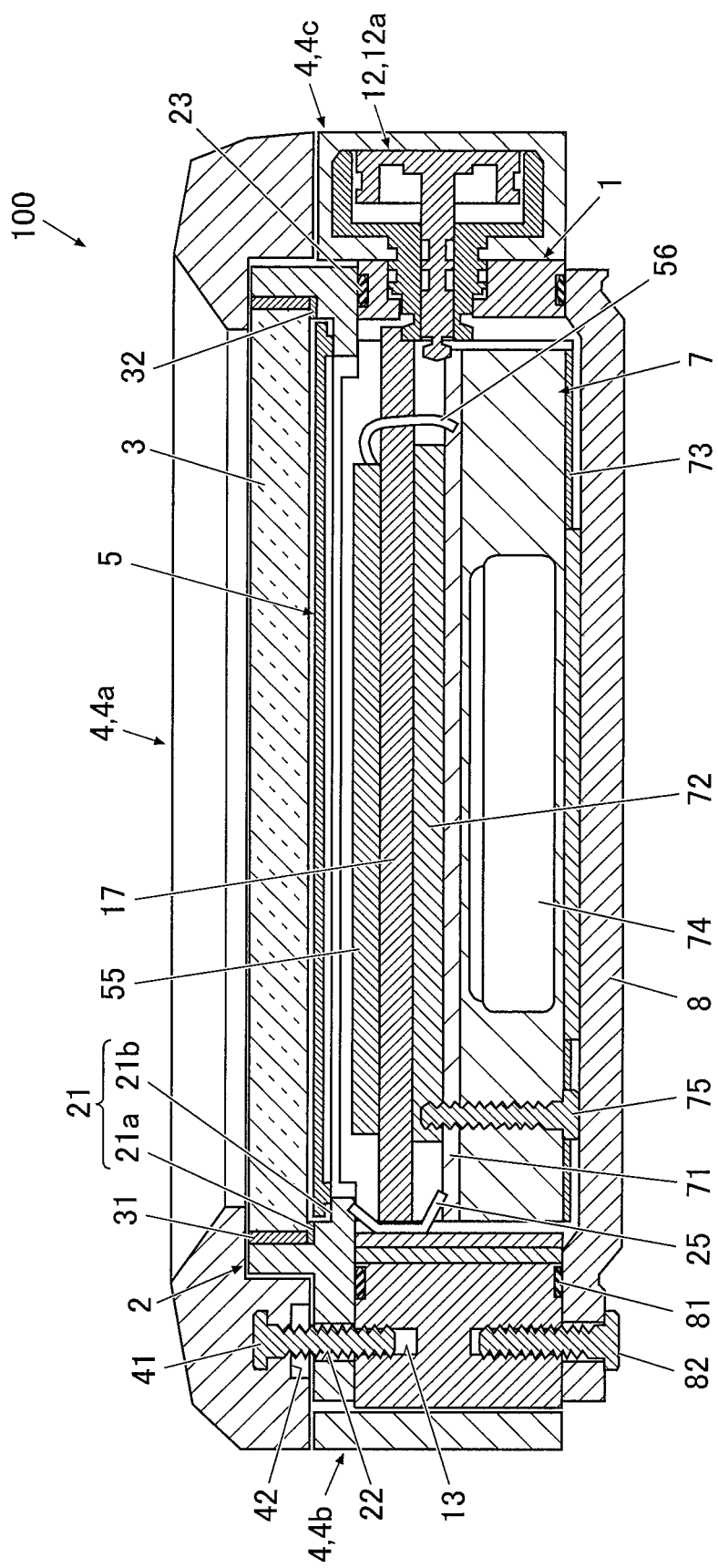
FIG. 3 is a sectional side view of the electronic timepiece shown in FIG. 1.

FIG. 3 is a sectional side view of the electronic timepiece 100.

As shown in FIG. 2, the exterior case 1 can be approximately cylindrical.

The upper side and the lower side of the exterior case 1 in its thickness direction (the up-down direction in FIG. 3) are opened such that the exterior case 1 is hollow. This hollow portion serves as storage space where various components are housed.

At both ends in the up-down direction in FIG. 1 (at 12 o'clock and 6 o'clock in an analog timepiece) of the exterior case 1, belt attachment parts 11 are formed. To the belt attachment parts 11, a not-shown timepiece belt(s) can be attached.

Further, as described below, the bezel 2 and a cushioning member 4 (4a to 4c) are fixed to the exterior case 1 with screws or the like. At points on the exterior case 1 corresponding to screw insertion positions, holes 13 are formed. (Refer to FIG. 2 and FIG. 3.)

On the outer circumferential surface of the exterior case 1, operation buttons 12 (operation buttons 12a and 12b) to input various operation instructions, such as instructions for time adjustment, are disposed. At the positions on the exterior case 1 for the operation buttons 12, through holes 14 through the exterior case 1 are formed.

Figure 4:
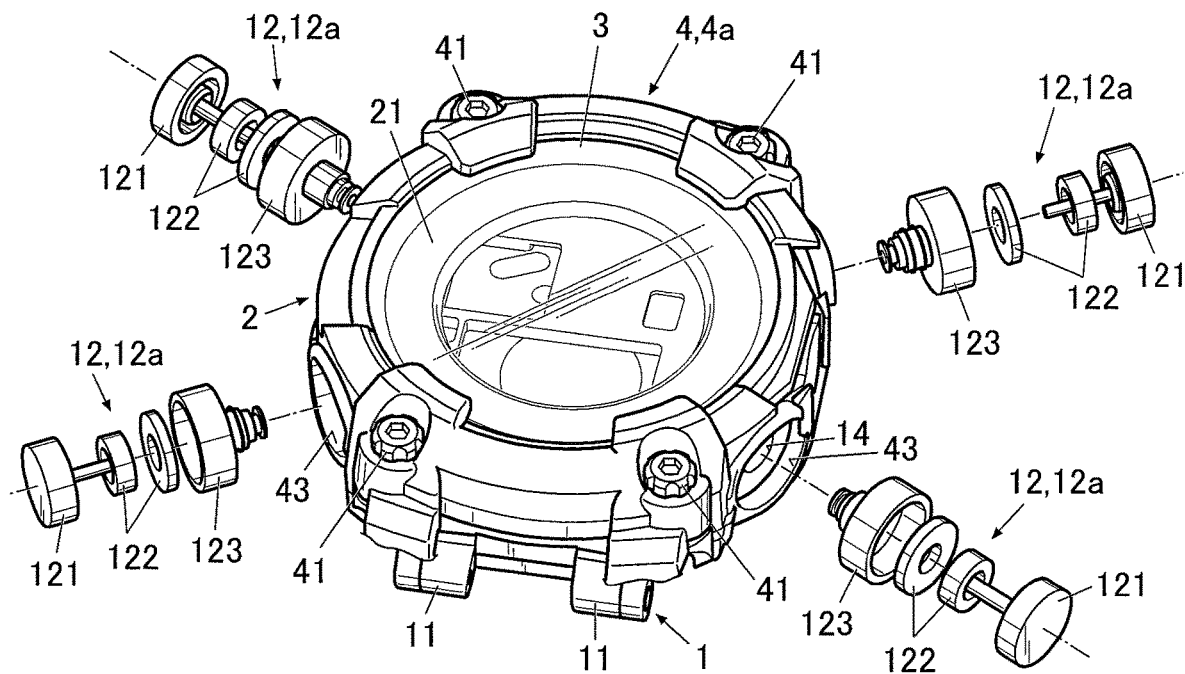
FIG. 4 is a partially exploded perspective view showing configuration of each operation button part of the electronic timepiece shown in FIG. 1.
Figure 5:
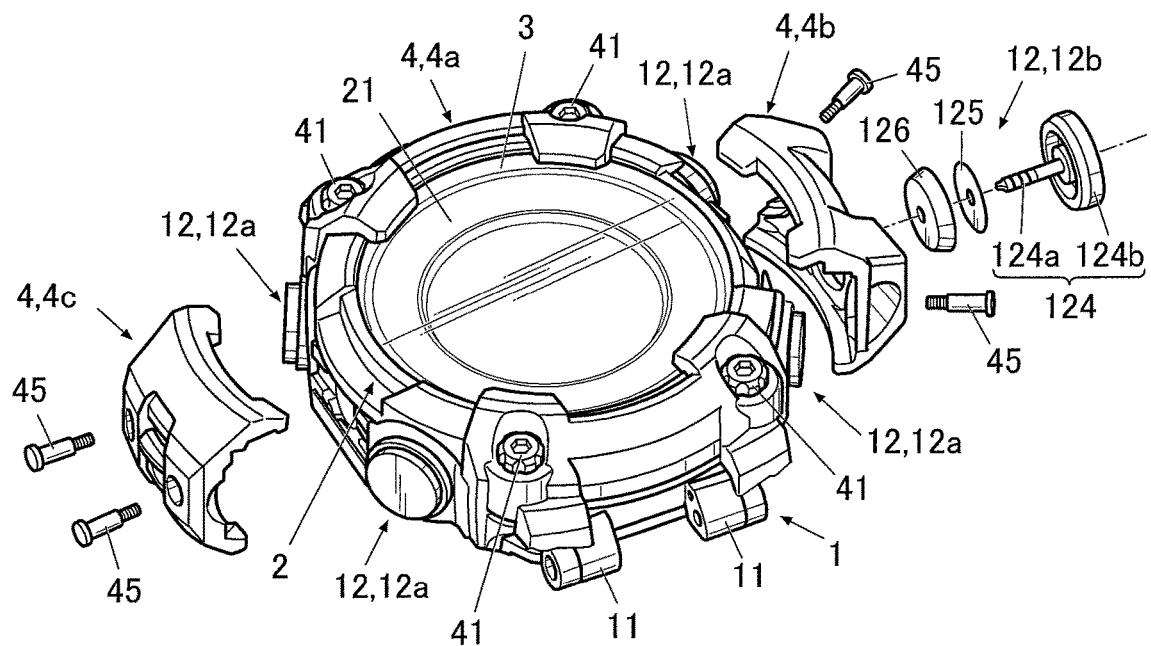
FIG. 5 is a partially exploded perspective view showing configuration of an operation button part and a cushioning member of the electronic timepiece shown in FIG. 1.

FIG. 4 and FIG. 5 are partially exploded perspective views showing configuration of each of a plurality of operation buttons 12.

As shown in FIG. 4, the electronic timepiece 100 has operation buttons 12a which are push buttons disposed at positions at approximately 2 o'clock, 4 o'clock, 8 o'clock and 10 o'clock in an analog timepiece.

Each push operation button 12a includes a body 121 which is operated by a user with his/her finger, a cushioning member 122 which serves as a cushion and absorbs impact or the like when the operation button 12a is operated, and a button pipe 123 which holds the body 121 in a state in which the body 121 is housed in the button pipe 123.

The tip of the button pipe 123 is inserted into the exterior case 1 from the through hole 14, and when the body 121 of the operation button 12a is operated, this operation is transmitted to timepiece modules or the like disposed in the exterior case 1.

As shown in FIG. 5, the electronic timepiece 100 has the operation button 12b which is a winding crown disposed at a position at approximately 3 o'clock in an analog timepiece.

The operation button 12b includes a body 124, a spacer 125 and a cushioning member 126 which serves as a cushion and absorbs impact when the operation button 12b is operated.

The body 124 includes a shaft part 124a one end of which is inserted into the exterior case 1 from the through hole 14, and a head part 124b which is disposed on the other end of the shaft part 124a and operated by a user with his/her finger.

When the body 124 of the operation button 12b is rotationally operated by a user, this operation is transmitted to the timepiece modules or the like disposed in the exterior case 1.

As shown in FIG. 3, in the storage space of the exterior case 1, various modules (timepiece modules) for the electronic timepiece 100 to function as a timepiece are housed. The various modules includes: a housing 7 in which a battery (cell) 74 and so forth are arranged; a circuit board (circuit circuit board 71) arranged on the upper surface of the housing 7; a pressing plate 73 which suppresses ricketiness of components, such as the circuit board 71; and a liquid crystal panel 55 as a display.

The housing 7, the circuit board 71 and so forth are fixed with a screw (s) 75 so that their unsteadiness, dislocation and so forth in the exterior case 1 are prevented.

The liquid crystal panel 55 is placed on a panel placement part 17 formed in the exterior case 1, and electrically connected with the circuit board 71 via a wiring member 56 constituted of a flexible wiring board or the like.

The liquid crystal panel 55 displays various types of information, such as time, a date, a day of a week and position information.

In this embodiment, the liquid crystal panel 55 is exposed to the visible side via a ring-shaped dial 5, which is described below, to be visible through a windshield member 3 (crystal, to be specific).

The display is not limited to the liquid crystal panel 55.

Usable examples as the display include various display units made of, for example, organic Electro Luminescence (EL).

The circuit board 71 is a circuit to receive radio waves with an antenna, and provided with a functional component set 72 constituted of various circuits including an antenna circuit, electronic components, and so forth all of which are not shown.

Figure 6:
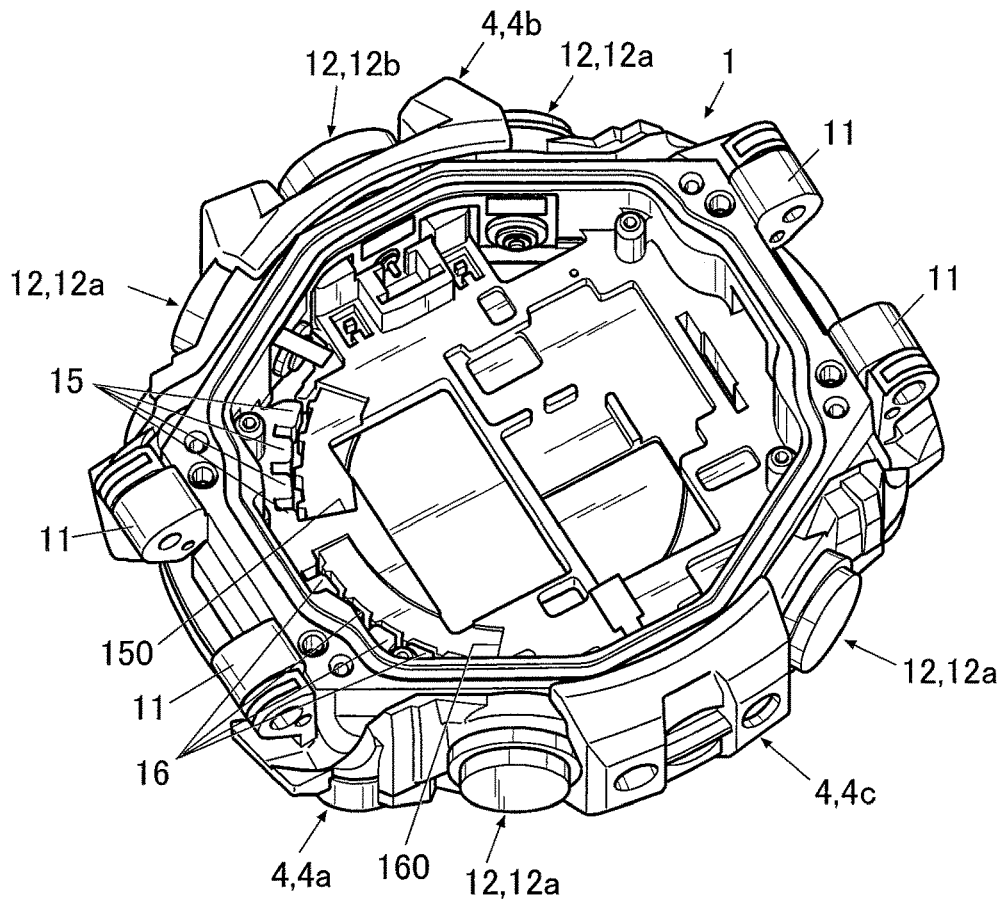
FIG. 6 is a perspective view of the electronic timepiece viewed from the back surface side with internal components removed.

FIG. 6 is a perspective view of the exterior case 1 viewed from the back surface side (an invisible side or the lower side in FIG. 3), the exterior case 1 shown in FIG. 2 being reversed.

As shown in FIG. 2 and FIG. 6, at or near a position which is on the outer edge portion of the exterior case 1 and corresponds to the antenna circuit mounted on the circuit board 71, a notched part 150 and circuit connection hole parts 15 are provided to insert a connecting member 25 which electrically connects the below-described bezel 2 with the circuit board 71.

Although the position and shape of the notched part 150, the number and arrangement of the circuit connection hole parts 15 to be provided, and so forth are not particularly limited, in this embodiment, the notched part 150 which is approximately arc-shaped along the shape of the outer edge of the exterior case 1 is formed at a position for 4 o'clock to 5 o'clock in an analog timepiece, and four circuit connection hole parts 15 are formed next to one another along a side of the notched part 150 close to the outer circumference of the exterior case 1.

Further, at a position which is on the outer edge portion of the exterior case 1 and is different from the position of the notched part 150 and the circuit connection hole parts 15, a notched part 160 and ground connection hole parts 16 are provided to insert a not-shown ground terminal which connects the bezel 2 to the ground.

Although the position and shape of the notched part 160, the number and arrangement of the ground connection hole parts 16 to be provided, and so forth are not particularly limited, in this embodiment, the notched part 160 which is approximately arc-shaped along the shape of the outer edge of the exterior case 1 is formed at a position for 7 o'clock to 8 o'clock in an analog timepiece, and five ground connection hole parts 16 are formed next to one another along a side of the notched part 160 close to the outer circumference of the exterior case 1.

As shown in FIG. 3, to the lower side (back surface) of the exterior case 1 (the lower side in FIG. 3 or the invisible side), a back cover member 8 as a closing member which closes the opening in the back surface of the exterior case 1 is attached via a waterproof ring 81.

The back cover member 8 is formed of a metal material, such as stainless steel or titanium, for example.

The material for forming the back cover member 8 is not limited to those exemplified herein.

Usable examples thereof include various resin materials including an ABS resin.

The back cover member 8 is fixed to the exterior case 1 with a screw 82.

On the outer upper side of the exterior case 1 (the upper side in FIG. 3, the visible side or the front surface side), the bezel 2 is arranged.

In this embodiment, the bezel 2 resonates with radio waves having a desired frequency, and functions as an antenna.

It is preferable that the radio waves having a desired frequency receivable by the bezel 2, which functions as an antenna, include radio waves transmitted from satellites.

For example, radio waves transmitted from GPS (Global Positioning System) satellites and radio waves transmitted from QZSS (Quasi-Zenith Satellite System), which are quasi-zenith satellites of Japan, have a frequency of 1575.42 MHz, and radio waves transmitted from GLONASS (GLObal NAvigation Satellite System) have a frequency band the center frequency of which is 1602.5625 MHz.

In this embodiment, the bezel 2 is made to function as an antenna which can receive radio waves having a desired frequency by appropriate setting of the size, shape, forming material and/or the like of the bezel 2.

For example, if the bezel 2 resonates with radio waves having a frequency of 1575.42 MHz for GPS and so forth and/or radio waves having a frequency of 1602.5625 MHz for GLONASS, the bezel 2 can receive radio waves transmitted from GPS and/or GLONASS. Consequently, the electronic timepiece 100 can make use of time information and position information contained in these radio waves.

The radio waves having a desired frequency receivable by the bezel 2, which functions as an antenna, are not limited to the radio waves transmitted from GPS satellites and so forth described above.

In this embodiment, at least a portion of the bezel 2 is formed of a metal material, such as SUS316 (stainless steel 316). The bezel 2 is formed to be ring-shaped, for example. The at least a portion of the bezel 2 can also be formed to be ring-shaped.

The material for forming the bezel 2 is not limited to SUS316.

However, in this embodiment, as described above, the bezel 2 functions as an antenna which resonates with radio waves having a desired frequency.

From this point, it is considered that if conductivity of the material forming the bezel 2 is low (resistivity thereof is high), sufficient antenna gain cannot be obtained.

To make the bezel 2 function as an antenna having excellent antenna gain, it is preferable to use, as the material for forming the bezel 2, a metal material having a certain level of conductivity or higher (i.e. having a certain level of resistivity or lower) and a certain level of magnetic permeability or lower.

From this point, as the material for forming the bezel 2 of this embodiment, for example, the following metal materials can be used: the abovementioned SUS316 (resistivity (μΩ·cm) of 74); SUS304 (resistivity (μΩ·cm) of 72); silver (resistivity (μΩ·cm) of 1.62); copper (resistivity (μΩ·cm) of 1.72); titanium (Ti) (resistivity (μΩ·cm) of 55); Nichrome (alloy of Ni, Fe and Cr) (resistivity (μΩ·cm) of 109); and Ti64 (resistivity (μΩ·cm) of 166).

The above metal materials have a magnetic permeability (relative magnetic permeability) of about 1.

The material for forming the bezel 2 should be appropriately selected in accordance with the frequency of radio waves desired to be received by the bezel 2 as an antenna and other various conditions, and hence is not limited to those exemplified herein.

Figure 7:
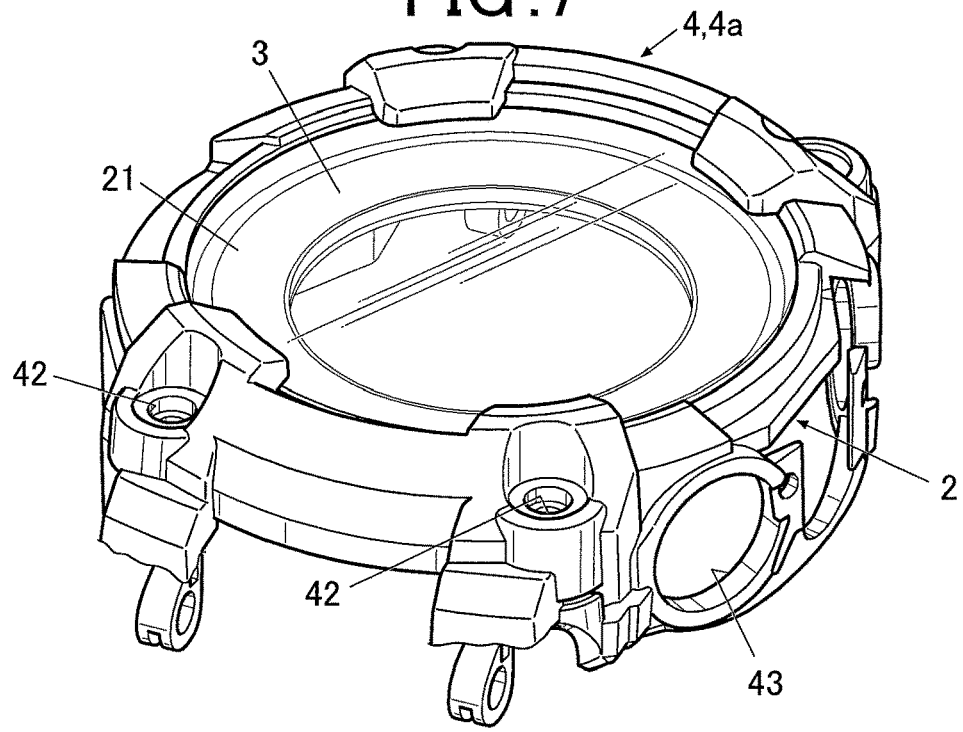
FIG. 7 is a perspective view showing a state in which first cushioning members are attached to a bezel.

FIG. 7 is a perspective view showing the bezel 2 and components surrounding the bezel 2.

Figure 8:
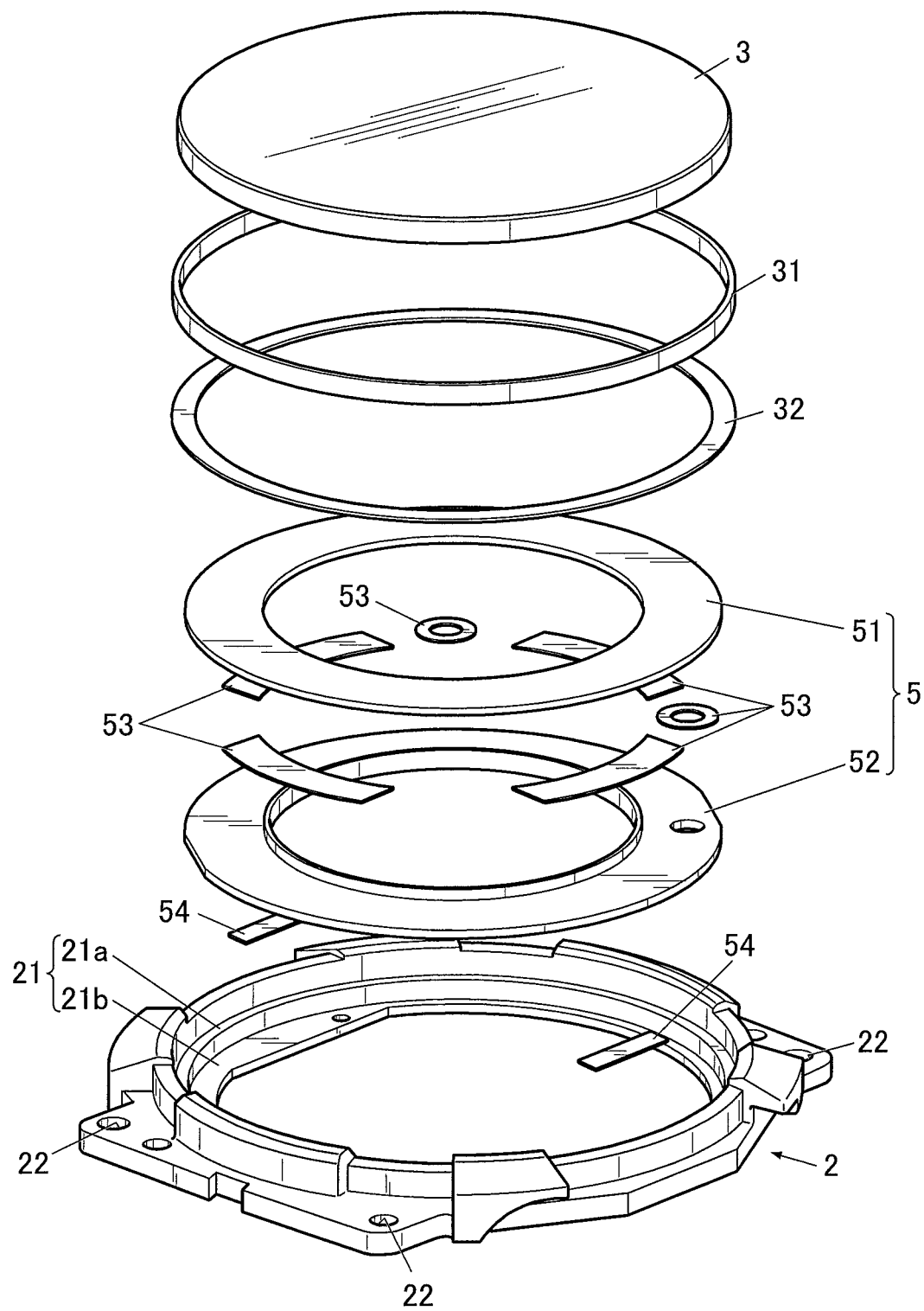
FIG. 8 is an exploded perspective view showing the bezel and components to be fitted into the bezel.

FIG. 8 is an exploded perspective view showing the bezel 2 and components to be arranged in the bezel 2.

As shown in FIG. 7 and FIG. 8, the bezel 2 has an inward flange part 21 which projects from the inner side surface (inner circumferential surface) of the ring-shaped bezel 2 toward the center of the ring-shaped bezel 2.

The inward flange part 21 of this embodiment includes: a first stage flange 21*a*; and a second stage flange 21*b* which is formed on a further lower side than the first stage flange 21*a* (the lower side in FIG. 8) and projects further toward the center of the ring-shaped bezel 2 than the first stage flange 21*a*.

On the upper surface (the surface on the upper side in FIG. 8) of the second stage flange 21*b*, the outer edge of the dial 5 is placed.

The dial 5 of this embodiment includes an upper dial 51 and a lower dial 52 which are adhesively fixed to one another with an adhesive member 53 constituted of, for example, a double-sided tape not to be dislocated, thereby being integrated with one another.

The lower surface of the dial 5 (the back surface of the lower dial 52) is adhesively fixed to the upper surface of the second stage flange 21*b* with an adhesive member 54 constituted of a double-sided tape or the like so that the dial 5 is not dislocated.

On the upper surface (the surface on the upper side in FIG. 8) of the first stage flange 21*a*, the outer edge of the windshield member 3 is placed via a spacer 32.

If a component under the windshield member 3 (the dial 5, in this embodiment) is not sufficiently fixed, the component may contact or stick to the lower surface of the windshield member 3. The spacer 32 is for preventing this situation from happening and catches the outer edge of the windshield member 3.

It is preferable that the spacer 32 be subjected to glass printing or the like so as to be invisible from the outside.

The spacer 32 is formed of PET (PolyEthylene Terephthalate, i.e. a PET resin), for example. Although its forming method is not particularly limited, a method of cutting out a pattern from (i.e. punching out in) a PET sheet can be used, for example.

In addition to the forming method, the material for forming the spacer 32 is not particularly limited, either.

Usable examples as the spacer 32 include double-sided tapes having a certain level of hardness, components molded from an ABS resin, a polycarbonate (PC) resin and so forth, and components formed of various metal materials.

In the bezel 2 (the first stage flange 21a of the bezel 2, in this embodiment), a waterproof ring 31 is arranged. The windshield member 3 is press-fitted into the bezel 2 with the waterproof ring 31 in between, so that the windshield member 3 is fitted in and fixed to the ring-shaped bezel 2, and is supported by the inward flange part 21 (the first stage flange 21a, in this embodiment).

Configuration of the inward flange part 21 is not limited to that exemplified herein.

For example, the exterior case 1 may have a supporting part which supports the dial 5, and the inward flange part 21 may be a flange part having only one stage (corresponding to the first stage flange 21a in this embodiment) which supports the windshield member 3.

The windshield member 3 can be formed of a transparent material and is a cover glass which covers the visible side of the electronic timepiece 100.

Usable examples of the transparent material for forming the windshield member 3 include various types of glass including super white glass, sapphire (transparent synthetic sapphire), and acrylic glass made of a resin material.

It is preferable that the material for forming the windshield member 3 be a dielectric substance, such as super white glass or sapphire.

In this embodiment, the bezel 2 is made to function as the antenna.

Hence, use of the dielectric substance as the material for forming the windshield member 3, which is contiguous with the bezel 2, can promise increase in antenna gain of the bezel 2 as an antenna.

Hereinafter, configuration to electrically connect the bezel 2 with the circuit board 71 (the antenna circuit mounted on the circuit board 71) is described with reference to FIG. 9A to FIG. 9C.

Figure 9A:
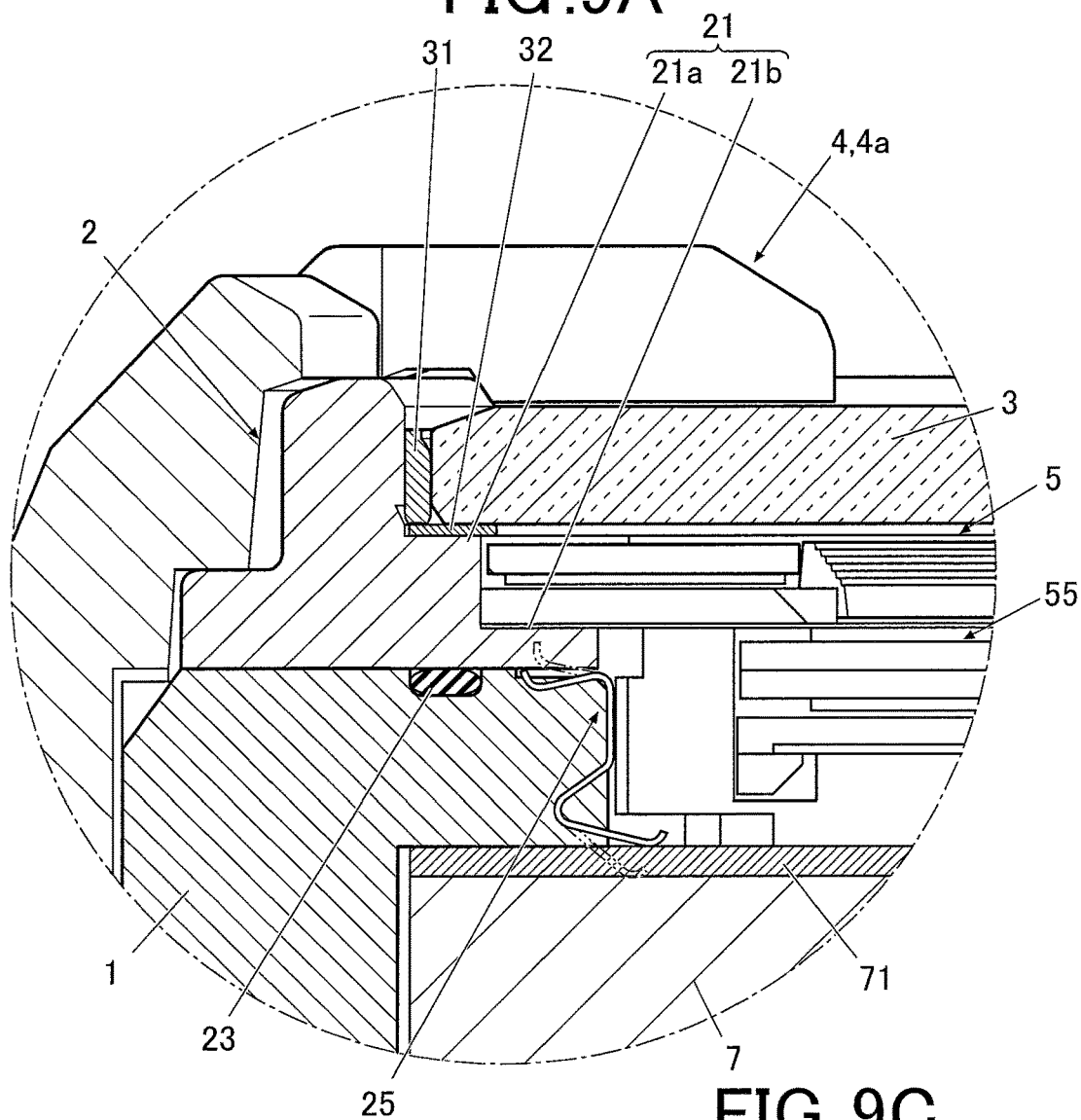
FIG. 9A is a sectional view showing a connection portion where the bezel is connected with a circuit board and its surroundings.

FIG. 9A is an enlarged sectional view showing a connection portion where the bezel 2 is connected with the circuit board 71.

Figure 9B:
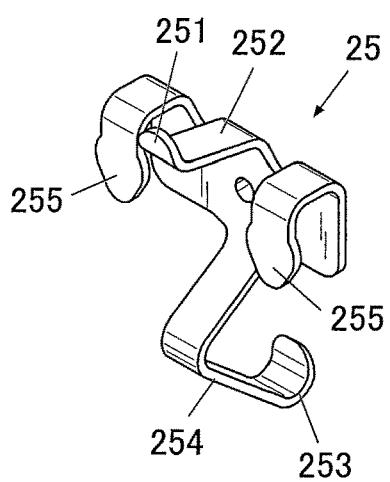
FIG. 9B is a perspective view of a connecting member.

FIG. 9B is a perspective view of the connecting member 25 which connects the bezel 2 with the circuit board 71.

Figure 9C:
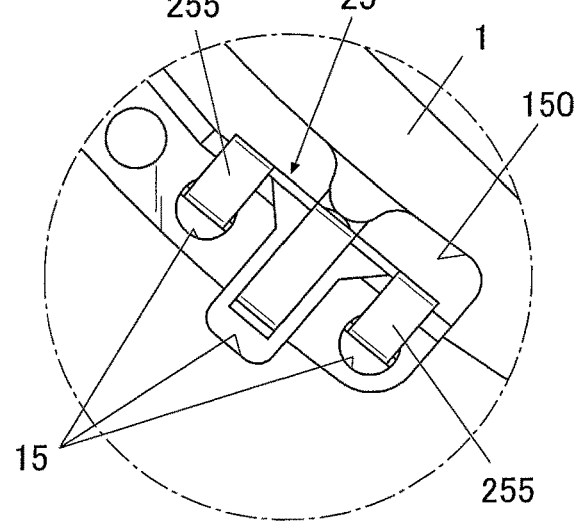
FIG. 9C is a plan view showing a state in which the connecting member is arranged in a circuit connection hole part.

FIG. 9C is a plan view showing a state in which the connecting member 25 is inserted into the circuit connection hole part 15 of the exterior case 1 viewed from the visible side.

As shown in FIG. 9A, between the bezel 2 and the circuit board 71 of this embodiment, the connecting member 25 is arranged.

The connecting member 25 is a terminal plate formed of a conductive material. Examples thereof include various metal materials.

The connecting member 25 is interposed between the bezel 2 and the circuit board 71, so that the bezel 2 and the circuit board 71 are electrically connected with one another.

As shown in FIG. 9B, the connecting member 25 has: at one end, a connecting tongue piece 252 having a bezel-side connecting part 251 which is connected to the bezel 2; and at the other end, a connecting leg part 254 having a circuit board side connecting part 253 which is connected to the circuit board 71.

The connecting member 25 also has, at both (right and left) sides of the connecting tongue piece 252, hook parts 255 which are bent toward the connecting leg part 254.

The connecting member 25 is formed, for example, by die-cutting and then bending a thin metal plate in such a way as to form the bezel-side connecting part 251, the connecting tongue piece 252, the circuit board side connecting part 253, the connecting leg part 254 and the hook parts 255. The whole connecting member 25 has spring properties.

As shown in FIG. 9C, the connecting member 25 is inserted into the notched part 150 of the exterior case 1, and the pair of the hook parts 255 is inserted into one of the circuit connection hole parts 15 from the above (the upper side in FIG. 9A or the bezel 2 side), so that the connecting member 25 is set.

Then, from the above the exterior case 1, the bezel 2 is placed, so that the connecting member 25 is interposed between the bezel 2 and the circuit board 71, and its position is fixed.

In FIG. 9A, the connecting member 25 in a state of no application of external force thereto is indicated by a two-dot chain line, and the connecting member 25 in a state of being interposed between the bezel 2 and the circuit board 71 and pressed in the up-down direction (the up-down direction in FIG. 9A or the thickness direction of the exterior case 1) is indicated by a solid line.

As shown in FIG. 9A, the connecting member 25 is arranged between the bezel 2 and the circuit board 71 in a state of being pressed from its resting position and thereby exerts an opposing force against the bezel 2 and the circuit board 71.

The bezel-side connecting part 251 is pressed on the back surface (the lower surface in FIG. 9A) of the bezel 2, and the circuit board side connecting part 253 is pressed on the front surface (the upper surface in FIG. 9A) of the circuit board 71.

Into the ground connection hole part 16, the not-shown ground terminal is inserted to connect the bezel 2 to the ground.

In this embodiment, the circuit board 71 functions as the ground, and one end and the other end of the ground terminal contact the bezel 2 and the circuit board 71, respectively.

The component which functions as the ground is not limited to the circuit board 71.

If there is another component which functions as the ground, the ground terminal is arranged such that the other end thereof contacts this component as the ground.

In this way, the bezel 2 formed of a metal material is electrically connected with the circuit board 71 (the antenna circuit mounted on the circuit board 71) and connected to the ground, and consequently can function as an antenna.

If the frequency of radio waves desired is low, for example, the size of the bezel 2 is set to be large to function as an antenna which can resonate with radio waves having a low frequency.

In contrast, if the frequency of radio waves desired is high, for example, the size of the bezel 2 is set to be small to function as an antenna which can resonate with radio waves having a high frequency.

By these settings performed, the bezel 2 can receive radio waves having a desired frequency.

As shown in FIG. 4, FIG. 5 and so forth, the electronic timepiece 100 of this embodiment further includes the cushioning member 4 which partially or entirely covers the bezel 2.

The cushioning member 4 can be formed of resin, such as a urethane resin.

As described above, in this embodiment, the bezel 2 is made to function as an antenna. Hence, it is preferable that the cushioning member 4 which contacts the bezel 2 be formed of a nonconductive low-loss (dielectric loss (tanō)) material in order not to block the function of the bezel 2 as an antenna.

The electronic timepiece 100 includes, as the cushioning member 4, first cushioning members 4a which cover portions of the bezel 2 at 12 o'clock and 6 o'clock in an analog timepiece, a second cushioning member 4b which covers a portion of the bezel 2 at 3 o'clock in an analog timepiece, and a third cushioning member 4c which covers a portion of the bezel 2 at 9 o'clock in an analog timepiece.

In each of the first cushioning members 4a which respectively cover the portions t 12 o'clock and 6 o'clock in an analog timepiece, two screw holes 42 to insert screws 41 are formed.

As shown in FIG. 3, the screws 41 are inserted from the screw holes 42 formed in the first cushioning members 4a into the holes 13 formed in the exterior case 1 via screw holes 22 formed in the bezel 2, so that the bezel 2 and the cushioning member 4 (the first cushioning members 4a, in this embodiment) are screwed to the exterior case 1.

On the first cushioning members 4a, at the positions where the operation buttons 12 (12a) are disposed, holes 43 to insert the operation buttons 12 (12a) into the exterior case 1 are formed.

On the second cushioning member 4b, at the position where the operation button 12 (12b) is disposed, a not-shown hole to insert the operation button 12 (12b) into the exterior case 1 is formed.

The second cushioning member 4b and the third cushioning member 4c are fixed (screwed) to the exterior case 1 with screws 45, and at the positions where the screws 45 are inserted, not-shown screw holes are formed.

Configuration of the cushioning member 4 is not limited to that exemplified herein.

For example, the cushioning member 4 may be formed to be continuous, not being divided.

Further, the cushioning member 4 may entirely cover the bezel 2.

Next, a method of assembling the electronic timepiece 100 according to another embodiment of the invention is described.

In assembling of the electronic timepiece 100, first, the dial 5 is arranged such that its outer edge is placed on the second stage flange 21b of the inward flange part 21 of the bezel 2, and the dial 5 is fixed thereto with the adhesive member 54, such as a double-sided tape.

Next, the waterproof ring 31 is arranged in the first stage flange 21a of the inward flange part 21 of the bezel 2 along the inner side surface of the bezel 2, and also the spacer 32 is arranged on the upper surface of the first stage flange 21a, and the windshield member 3 is press-fitted into the bezel 2 from the above.

Next, the first cushioning members 4a, the second cushioning member 4b and the third cushioning member 4c are attached to the outer side of the bezel 2. The first cushioning members 4a and the bezel 2 are fixed to the exterior case 1 with the screws 41. The second cushioning member 4b and the third cushioning member 4c are fixed to the exterior case 1 with the screws 45.

Next, the operation buttons 12 (12a and 12b) are attached by being inserted into the holes 43 of the first cushioning members 4a and the through holes 14 of the exterior case 1.

Next, the connecting member 25 is arranged in the notched part 150, and the hook parts 255 of the connecting member 25 are fitted in and fastened to the circuit connection hole part 15. Also, the ground terminal is arranged in the notched part 160 and fitted in and fastened to the ground connection hole part 16.

Next, the housing 7 housing the battery 74 and so forth, the circuit board 71, the liquid crystal panel 55 and so forth are arranged in the exterior case 1, and the opening in the back surface of the exterior case 1 is closed by the back cover member 8.

In an assembled state of the electronic timepiece 100, the bezel 2 is electrically connected with the circuit board 71 via the connecting member 25.

At the time, between the bezel 2 and the circuit board 71, the connecting member 25, which has spring properties, is pressed and thereby compressed from its resting position. This can ensure a sufficient contact pressure, through exertion of an opposing force against the bezel 2 and the circuit board 71, and consequently can surely connect the bezel 2 and the circuit board 71 with one another.

Further, in the assembled state of the electronic timepiece 100, the bezel 2 is connected with the circuit board 71, which functions as the ground in this embodiment, via the ground terminal.

In this way, the bezel 2, at least a portion of which is formed of a metal material can function as an antenna.

Further, for example, if signals from GPS satellites are desired to be received, the size, forming material and/or the like of the bezel 2 are set such that the bezel 2 can resonate with radio waves having a desired frequency, for example, 1575.42 MHz. In this way, the bezel 2 as an antenna can receive radio waves having a desired frequency.

Reception of radio waves having a desired frequency enables acquirement of accurate time information, position information and so forth, and consequently enables correction of, for example, time to be displayed by the electric timepiece 100 to right one as needed.

As described above, according to this embodiment, the electronic timepiece 100 can include: the cylindrical exterior case 1 in which the circuit board 71 where the antenna circuit is formed is housed; and the bezel 2 which is formed of a metal material, disposed on the outer upper side of the exterior case 1, and electrically connected with the circuit board 71, wherein the bezel 2 resonates with radio waves having a desired frequency.

That is, the bezel 2 arranged outside other components, such as the exterior case 1, which constitute the electronic timepiece 100 is made to function as an antenna. This allows the bezel 2 to readily receive radio waves with excellent antenna gain, being hardly affected by the materials forming the exterior case 1 and so forth.

Further, the bezel 2, which is an exterior member assumed to be seen, is made to function as an antenna. This can produce simpler configuration as compared with a case where a component which functions as an antenna is covered with another component not to be exposed, and also contributes to downsizing of the electronic timepiece 100 as a whole.

If the component which covers an antenna is provided, a nonconductive material which hardly affects antenna characteristics, such as ceramic, needs to be used therefor. However, ceramic or the like is vulnerable to impact, and hence the component made thereof is subject to breakage, which may make it difficult to keep external appearance beautifully.

Then, in this embodiment, the bezel 2, which is an exterior member, is made to function as an antenna. This eliminates a need to provide the component made of a nonconductive material vulnerable to impact, and consequently strength can be kept.

Further, because the bezel 2 functions as an antenna which resonates with radio waves having a desired frequency by appropriate setting of, for example, the size, shape, forming material and/or the like of the bezel 2, the electronic timepiece 100 can receive the radio waves having the desired frequency with the bezel 2 as an antenna.

This can realize the electronic timepiece 100 which can acquire accurate time information and position information.

Further, in this embodiment, the electronic timepiece 100 further includes the cushioning member 4 which is formed of a nonconductive material and partially or entirely covers the bezel 2.

Hence, if the electronic timepiece 100, for example, falls down or hits something by external force being applied thereto, the cushioning member 4 can absorb the impact.

If such impact is on the electronic timepiece 100, the bezel 2 may be broken, damaged, distorted or deformed, for example.

Breakage or the like of the bezel 2 spoils the external appearance of the electronic timepiece 100, and also may result in shift of a point of contact or bad contact of the bezel 2, which functions as an antenna, and the circuit board 71, or may result in change in their combined state.

Then, in this embodiment, the cushioning member 4 is provided, so that the electronic timepiece 100 is configured to absorb the impact. This can prevent breakage, deformation or the like of the bezel 2, shift of the point of contact or bad contact of the bezel 2 and the circuit board 71, or the like, and consequently can keep design quality of the external appearance of the electronic timepiece 100, and also can prevent change in antenna characteristics or gain, which may be caused by the impact, and consequently can prevent degradation of antenna performance or the like.

Further, the bezel 2 of this embodiment is connected with the circuit board 71 via the connecting member 25.

That is, the bezel 2, which functions as an antenna, is connected with the circuit board 71 directly by the connecting member 25. This stabilizes their connection state and can keep excellent antenna characteristics as compared with a case where an antenna is connected with a circuit board indirectly by capacitive coupling.

Further, in this embodiment, the bezel 2 and the cushioning member 4 are screwed to the exterior case 1.

This can prevent dislocation of the bezel 2, which functions as an antenna in this embodiment, and also can surely protect the bezel 2 with the cushioning member 4.

Further, in this embodiment, the radio waves having the desired frequency receivable by the bezel 2, which functions as an antenna, include radio waves transmitted from satellites.

The bezel 2 resonates with radio waves having, for example, a frequency of 1575.42 MHz by appropriate setting of the size, shape, forming material and/or the like of the bezel 2, and consequently can receive radio waves transmitted from GPS (Global Positioning System) satellites and radio waves transmitted from QZSS, which are quasi-zenith satellites of Japan. This allows the electronic timepiece 100 to make use of time information and position information contained in these radio waves.

Although one or more embodiments are described above, the present invention is not limited to the embodiment (s) and can be modified in a variety of aspects without departing from the scope of the present invention.

For example, the configuration to connect the bezel 2 with the circuit board 71 is not limited to that exemplified in the embodiment. For example, a coaxial cable or a feed pin may be used therefor.

Further, the electronic timepiece 100 may include a solar panel.

In this case, the solar panel is arranged at a position relatively close to the bezel 2, which functions as an antenna. Hence, it is preferable that consideration be also given to, for example, the relative permittivity of the material for forming the solar panel so as to be suitable for the frequency of radio waves desired to be received by the bezel 2.

Further, in the embodiment, the circuit board 71 serves as the ground. However, the ground to which the bezel 2, which functions as an antenna, is connected is not limited to the circuit board 71.

For example, if the dial 5 is formed of a metal material or the like, the dial 5 may function as the ground. In this case, one end and the other end of the ground terminal are connected to the bezel 2 and the dial 5, respectively.

Further, if the electronic timepiece 100 includes the solar panel as described above, the solar panel may function as the ground.

Further, in the embodiment, the electronic timepiece 100 includes the digital display constituted of the liquid crystal panel 55 or the like. However, the display disposed in the electronic timepiece 100 is not limited to such a digital display.

For example, the display may be an analog display having hands or the like, or may be an analog-digital display.

Further, in this embodiment, the electronic timepiece 100 is a watch, but not limited thereto. The electronic timepiece of the present invention is applicable to a wide range of devices as far as they can be used as a timepiece.

For example, the electronic timepiece of the present invention may be applied to various devices including a pedometer, an altimeter and a barometer.

Although one or more embodiments are described above, the scope of the present invention is not limited thereto, and includes the scope of claims below and the scope of their equivalents.

What is claimed is:

1. An electronic timepiece comprising:
    an exterior case;
    one or more circuits housed in the exterior case, wherein the one or more circuits are configured to process a signal in a radio wave having a predetermined frequency;
    a bezel disposed on an outer side of the exterior case,
        wherein the bezel comprises a metal portion configured to resonate with the radio wave; and
    an electrical connection configured to transmit the signal in the radio wave received by the metal portion of the bezel to the one or more circuits,
        wherein the electrical connection is arranged in the exterior case and configured to have a spring-like property such that, in a state in which the electrical connection electrically connects the metal portion of the bezel and the one or more circuits, the electrical connection is compressed from its resting position and thereby exerts an opposing force against the bezel and the one or more circuits to maintain the electrical connection between the metal portion of the bezel and the one or more circuits.

2. The electronic timepiece according to claim 1, further comprising a cushioning member formed of a nonconductive material, wherein the cushioning member is arranged to partially or entirely cover the bezel.

3. The electronic timepiece according to claim 1, further comprising a screw configured to screw the bezel to the exterior case.

4. The electronic timepiece according to claim 2, further comprising a screw configured to screw the bezel and the cushioning member to the exterior case.

5. The electronic timepiece according to claim 1,
wherein the radio wave having the predetermined frequency is transmitted from a satellite, and
wherein one or more of a size, material and shape of the metal portion of the bezel is selected so that the metal portion of the bezel resonates with the radio wave.

6. The electronic timepiece according to claim 1, further comprising a cover through which one or more components arranged between the cover and the one or more circuits is visible,
wherein the bezel defines at least one flange configured to support the cover.

7. The electronic timepiece according to claim 1, further comprising a cushioning member formed of a nonconductive material,
wherein one or more of a material of the cushioning member and an arrangement of the cushioning member relative to the bezel and the electrical connection is selected to absorb an impact force directed at one or more of the bezel and the electrical connection.

8. The electronic timepiece according to claim 1, further comprising a cushioning member formed of a nonconductive material,
wherein one or more of a material of the cushioning member and an arrangement of the cushioning member relative to the bezel is selected to absorb an impact force directed at the bezel.

9. A method of assembling an electronic timepiece, the method comprising:
providing an exterior case;
providing one or more circuits configured to process a signal in a radio wave having a predetermined frequency, to be housed in the exterior case;
providing a bezel comprising a metal portion configured to resonate with the radio wave, to be disposed on an outer side of the exterior case; and
providing an electrical connection configured to transmit the signal in the radio wave received by the metal portion of the bezel to the one or more circuits, to be arranged in the exterior case, wherein the electrical connection has a spring-like property such that, in a state in which the electrical connection electrically connects the metal portion of the bezel and the one or more circuits, the electrical connection is compressed from its resting position and thereby exerts an opposing force against the bezel and the one or more circuits to maintain the electrical connection between the metal portion of the bezel and the one or more circuits.

10. The method according to claim 9,
wherein the bezel defines at least one flange, and
wherein the method further comprises providing a cover, through which one or more components arranged between the cover and the one or more circuits is visible, to be supported by the at least one flange of the bezel.

11. The method according to claim 9, further comprising:
providing a cushioning member formed of a nonconductive material to be arranged relative to the bezel and the electrical connection to absorb an impact force directed at one or more of the bezel and the electrical connection.

12. The method according to claim 9, further comprising:
providing a cushioning member formed of a nonconductive material to be arranged relative to the bezel to absorb an impact force directed at the bezel.

* * * * *